United States Patent [19]

Tanaka et al.

[11] Patent Number: 4,762,388
[45] Date of Patent: Aug. 9, 1988

[54] OPTICAL CONNECTOR RECEPTACLE AND PLUG

[75] Inventors: Toshiyasu Tanaka; Sadakazu Ariga, both of Yokohama, Japan

[73] Assignee: E. I. Du Pont de Nemours and Company, Wilmington, Del.

[21] Appl. No.: 712,404

[22] Filed: Mar. 15, 1985

[30] Foreign Application Priority Data

| Mar. 19, 1984 | [JP] | Japan | 59-39197[U] |
| Mar. 19, 1984 | [JP] | Japan | 59-39198[U] |
| Mar. 19, 1984 | [JP] | Japan | 59-39199[U] |
| Oct. 22, 1984 | [JP] | Japan | 59-220490 |
| Nov. 24, 1984 | [JP] | Japan | 59-246987 |

[51] Int. Cl.$^4$ ............................................. G02B 6/36
[52] U.S. Cl. .............................. 350/96.20; 350/96.21
[58] Field of Search ............... 350/96.20, 96.21, 96.22, 350/96.23

[56] References Cited

U.S. PATENT DOCUMENTS

| 4,140,367 | 2/1979 | Makuch et al. | 350/96.21 X |
| 4,529,263 | 7/1985 | Moriyama et al. | 350/96.20 |
| 4,687,292 | 8/1987 | Krausse | 350/96.21 |
| 4,715,674 | 12/1987 | Schulz et al. | 350/96.21 |
| 4,715,675 | 12/1985 | Kevern et al. | 350/96.20 |

FOREIGN PATENT DOCUMENTS

| 0064618 | 11/1982 | European Pat. Off. | 350/96.21 |
| 0119013 | 9/1984 | European Pat. Off. | 350/96.20 X |
| 55-67713 | 5/1980 | Japan | 350/96.21 |
| 58-78111 | 5/1983 | Japan | 350/96.20 |
| 83/02335 | 7/1983 | PCT Int'l Appl. | 350/96.20 X |

OTHER PUBLICATIONS

Uberbacher, "Optical Connector", IBM Technical Disclosure Bull., vol. 25, No. 118, Apr. 1983, pp. 6282-6283.

Primary Examiner—William L. Sikes
Assistant Examiner—Brian M. Healy

[57] ABSTRACT

A receptacle adapted for connection in tight fit with an optical connector plug having a protective guide member surrounding a ferrule accommodating an optical fiber therein and spaced away from the outer circumference of the ferrule. The receptacle comprises at least a first supporting member having a hollow passage capable of receiving the ferrule, and a second supporting member spaced from the first supporting member for receiving and supporting the protective guide member of the ferrule. The plug comprises at least a ferrule containing an optical fiber therein and adapted to be received in the hollow passage of the first supporting member of the receptacle, and a protective guide member surrounding the ferrule at a position spaced away from the outer circumference of the ferrule and adapted to be received in the space between the first and second supporting members of the receptacle.

12 Claims, 4 Drawing Sheets

OPTICAL CONNECTOR RECEPTACLE AND PLUG

BACKGROUND OF THE INVENTION

This invention relates to a receptacle and a plug for an optical connector, and an optical connector comprised of these elements connected together.

With the recent advances in optical communication technology, optical communications are very frequently transmitted not only over long distances but also over short distances. Short-distance transmission is required, for example, in wirings within an optical communication machine or between optical communication machines. Furthermore, irrespective of the transmission distances, relaying of optical communication wirings becomes necessary in order to ensure transmission of optical communications. The structure of an optical connector used in transmitting optical communications is of paramount importance for securing an accurate transmission of optical communications.

SUMMARY OF THE INVENTION

It is an object of this invention to provide a plug and a receptacle for an optical connector having a novel structure.

Another object of this invention is to provide a plug and a receptacle for an optical connector in order to ensure generation and receipt of an optical signal from and at the forward end portion of an optical fiber received in a ferrule of the plug Still another object of this invention is to provide a receptacle and a plug for an optical connector which ensure an accurate receiving of an optical signal even when an unexpected external force is exerted on them while they are connected to each other in tight fit to form an optical connector.

Yet another object of this invention is to provide a receptacle for an optical connector which permits a very easy insertion and removal of the plug in spite of the fact that the plug can be fitted tightly and accurately into the receptacle; or a plug for an optical connector which permits very easily insertion and removal into and from an optical connector receptacle.

Further objects of this invention will become apparent from the following description.

According to this invention, these objects and advantages are achieved by a receptacle and a plug for an optical connector described below.

The receptacle of the invention is a receptacle adapted for connection in tight fit with an optical connector plug having a protective guide member surrounding a ferrule accommodating an optical fiber therein and spaced away from the outer circumference of said ferrule, said receptacle comprising at least (A) a first supporting member having a hollow passage capable of receiving the ferrule, and (B) a second supporting member spaced from the first supporting member for receiving and supporting the protective guide member of the ferrule.

The optical connector plug of this invention is a plug adapted for connection in tight fit with an optical connector receptacle comprising a first supporting member having a hollow passage and a second supporting member spaced from the first supporting member, said plug comprising at least (A') a ferrule containing an optical fiber therein and adapted to be received in the hollow passage of the first supporting member of the receptacle, and (B') a protective guide member surrounding the ferrule at a position spaced away from the outer circumference of the ferrule and adapted to be received in the space between the first and second supporting members of the receptacle.

DETAILED DESCRIPTION OF THE PREFERRED EMBODIMENTS

First, the description will be directed mainly to the optical connector receptacle of the invention.

The receptacle of this invention serves to form an optical connector when connected to the optical connector plug in tight fit. The plug has a protective guide member surrounding a ferrule containing an optical fiber therein at a position spaced from the outer circumference of the ferrule.

The receptacle of the invention at least has a first supporting member (A) and a second supporting member (B). The first supporting member has a hollow passage for receiving the ferrule of the optical connector plug. The second supporting member receives and supports the protective guide member for the ferrule of the plug in the space between the first and second supporting members. In other words, the optical connector receptacle of this invention may be said to be characterized by at least having a supporting system with a dual function which when the receptacle is connected to the optical connector plug, supports the plug both at the ferrule and at the protective guide member, and surely maintains a normal tight fit connection between the receptor and the plug even when an unexpected external force is exerted thereon.

The optical connector receptacle of this invention may further include a third supporting member which supports a holding member of the plug which is different from the parts supported by the first and second supporting members. Thus, the receptacle supports the optical connector plug including the ferrule, protective guide member and holding member at three parts and further ensures a normal tight fit connection between the receptacle and the plug.

The hollow passage of the first supporting member of the receptacle of this invention should receive the ferrule of the optical connector plug, and therefore, the first supporting member is a surrounding member for forming the hollow passage.

The hollow passage has a space sufficient for receiving the entry of the ferrule of the plug, and preferably has a configuration corresponding to the outer contour of the ferrule. The cross-section of the hollow passage may have various shapes in a direction at right angles to the entering direction of the ferrule of the plug. For example, if the ferrule has a circular or rectangular shape in a direction at right angles to the entering direction of the ferrule, the hollow passage may preferably have a circular or rectangular cross-section for receiving the ferrule of such a cross-sectional shape. When the hollow passage has a substantially circular cross-section, the ferrule can enter it irrespectively of the angle of rotation in a direction at right angles to the entering direction of the ferrule. Hence, this offers the advantage that the optical connector plug can be easily inserted into the optical connector receptacle. The substantially circular cross-sectional shape includes not only a shape having a substantially smooth circumference, but also a shape which has portions projecting from at least three points on the circumference toward the center of the circle and forms a substantial phantom circle by connecting the projecting forward ends.

The second supporting member is spaced from the first member, namely from the surrounding member of the hollow passage. The protective guide member of the ferrule of the plug is accommodated within the resulting space. The first supporting member, that is the surrounding member forming the hollow passage, is received in the space between the ferrule and the protective guide member of the optical connector plug when the ferrule of the plug is received in the hollow passage of the first supporting member and the protective guide member is received in the space between the first and second supporting members. Accordingly, the outer configuration of the first supporting member preferably has a configuration conforming to the inner circumferential surface of the protective guide member of the plug which faces the ferrule. This enables the protective guide member of the plug to be received intimately in the space between the first and second supporting members. The first supporting member can assume various outer configurations according to the form of the inner circumferential surface of the protective guide member of the plug which faces the ferrule. For example, it may have a substantially circular cross section in a direction at right angles to the entering direction of the ferrule of the optical connector plug.

In the receptacle of this invention, the second supporting member is spaced from the first supporting member. In other words, it may be said that the first supporting member is located in a space formed by the second supporting member. The level of the forward end portion of the first supporting member as viewed in the direction in which the optical connector plug advances may be substantially the same as, or different from, the level of the forward end surface of the second supporting member as viewed from the direction in which the optical connector plug advances. For example, in one preferred embodiment, the forward end portion of the first supporting member is located within the space formed by the second supporting member at a level lower than the forward end surface of the second supporting member.

The receptacle of this invention may have one or at least two hollow passages formed by at least one first supporting member in the space formed by the second supporting member. When it has two or more hollow passages, they can exist in the aforesaid space independently from each other without connection of the first supporting members forming the individual hollow passages. Alternatively, the first supporting members forming the individual hollow passages may be connected to each other, or the plurality of hollow passages may exist independently in a common first supporting member. In another embodiment including a plurality of hollow passages, these hollow passages may be connected by a linking passage provided in a common first supporting member having these hollow passages.

The plurality of hollow passages receive a plurality of ferrules of the plug. The plurality of ferrules are provided by optical connector plugs each having one ferrule and/or an optical connector plug having a plurality of ferrules. For example, one optical connector plug or two optical connector plugs having one ferrule may be fitted into the optical connector receptacle of the invention having two hollow passages.

Likewise, in an optical connector receptacle of this invention having three or more hollow passages, at least two hollow passages out of these can exist within the space formed by the second supporting member by connecting the first supporting members to each other, or in a common first supporting member. In this case, two ferrules of one optical connector plug having the two ferrules may fill two hollow passages present in the common first supporting member or connected first supporting members, and one ferrule of one optical connector plug having the one ferrule may fill the other one hollow passage.

In the receptacle of this invention having a plurality of hollow passages, the arrangement of the hollow passages in the space formed by the second supporting member can naturally be varied according to the form of the plug to be connected thereto. For example, when the second supporting member forms a space having a cross-sectional surface extending in a direction at right angles to the entering direction of the ferrule of the plug, the plurality of hollow passages of the first supporting member may be aligned side by side in the aforesaid extending direction of the space in the second supporting member.

By virtue of the above-described structure, the receptacle of this invention, when connected to the optical connector plug, can support the plug at at least two parts, namely at least at the ferrule and the protective guide member, and fix it firmly.

A preferred optical connector receptacle of this invention further includes a third supporting member which further receives and supports a holding member of the optical connector plug to provide a firmer connection with the optical connector plug. Usually, the third supporting member is provided outwardly of the second supporting member. For example, the third supporting member forms a space outwardly of the second supporting member, and receives and supports the optical connector plug in the space. When the holding member of the optical connector plug is an outwardly open spring-type holding member which upon collision with the supporting member, develops an outwardly open spring action to press the supporting member outwardly and thus exhibits its holding action, the third supporting member advantageously has a protrusion extending into the aforesaid space at a position apart from the second supporting member. The protrusion fits into a protrusion receiving portion of the outwardly open springtype holding member within the space and thus receives and firmly supports the forward end portion of the holding member. When the holding member of the optical connector plug is an inwardly closing spring-type holding member which upon collision with the supporting member, develops an inwardly closing spring action to press the supporting member inwardly and thus exhibits its holding action, the third supporting member may be a fixing protrusion extending outwardly from the outside surface of the second supporting member.

The optical connector receptacle of this invention may have a direction guide determining the fitting direction of the optical connector plug. Although the fitting direction of the optical connector plug can be regulated by, for example, forming the hollow passage of the optical connector receptacle in a form directly conforming to the configuration of the ferrule of the optical connector plug, the provision of the direction guide can easily regulate this fitting direction.

For example, when the optical connector receptacle has a plurality of hollow passages in the first supporting member, the aforesaid direction guide may be provided on the first or second supporting member within the space formed by the second supporting member. The direction guide may be formed as a recess or a protrusion on the first or second supporting member.

Now, the optical connector plug of the invention suitable for connection to the optical connector receptacle of this invention will be described.

The optical connector plug of the invention at least has a ferrule (A') including an optical fiber and (B'') a protecting guide member (B'). The ferrule is adapted to be received in the hollow passage of the first supporting member of the optical connector, and the protecting member (B') is adapted to be accommodated in the space between the first and second supporting members of the optical connector receptacle. In other words, the optical connector plug of this invention is structurally characterized in that when fitted into the optical connector receptacle, it is supported by the receptacle first, at the ferrule and then at the protective guide member, and therefore, the normal tight fit connection between the plug and the receptacle can be surely maintained even when an unexpected external force is exerted.

The optical connector plug of the invention may further has a holding member which is supported by the third supporting member of the optical connector receptacle. This type of plug is supported at three parts, i.e. the ferrule, the protective guide member and the holding member, by the optical connector receptacle, and therefore, its normal tight fit connection to the receptacle can be maintained more surely.

The ferrule including an optical fiber in the plug of this invention should be received in the hollow passage of the first supporting member of the optical connector receptacle. Hence, the first supporting member of the receptacle is a surrounding member forming the hollow passage, and the hollow passage has a space large enough to receive the entry of the ferrule of the plug, and preferably a straight passage conforming to the contour of the ferrule. In other words, the ferrule preferably has an outer configuration smoothly following the hollow passage. The ferrule may have various shapes in a direction at right angles to the entering direction of the ferrule. For example, when the hollow passage has a circular or rectangular cross-sectional surface in a direction at right angles to the entering direction of the ferrule, the cross section of the ferrule is preferably circular or rectangular so that it can be received in the hollow passage of such a shape. Into the hollow passage having a substantially circular cross-sectional surface, the ferrule can be advanced independently of the rotating angle in a direction at right angles to its advancing direction, and this offers an advantage of easily inserting the optical connector plug into the optical connector receptacle.

The protective guide member surrounds the ferrule in a spaced-apart relationship to the outer circumference of the ferrule, and the first supporting member of the optical connector receptacle, namely the surounding member for the hollow passage, is received within the space formed between them. In other words, while the first supporting member of the optical connector receptacle is received in the space between the ferrule and the protective guide member of the optical connector plug, the ferrule is accommodated in the hollow passage of the first supporting member of the receptacle and the protective guide member is accommodated in the space between the first and second supporting members of the optical connector receptacle. Preferably, therefore, the inner circumferential surface of the protective guide member of the plug which faces the ferrule has a configuration following the outer configuration of the first supporting member. This enables the protective guide member of the plug to be accommodated in tight fit in the space between the first and second supporting members of the optical connector receptacle. The inner circumferential surface of the protective guide member which faces the ferrule may assume various shapes according to the outer configuration of the first supporting member of the receptacle. For example, it may have a substantially circular shape in a direction at right angles to the entering direction of the ferrule of the plug.

In the optical connector receptacle to be connected to the optical connector plug of this invention, the second supporting member is spaced away from the first supporting member. In other words, it may be said that the first supporting member is located within the space formed by the second supporting member.

The protective guide member of the optical connector plug of this invention is accommodated in the space between the first supporting member and the second supporting member, and therefore preferably has such a form that its outer circumferential surface follows the inner circumferential surface of the second supporting member of the receptacle. In this case, the protective guide member is accommodated in tight fit in the aforesaid space between the first and second supporting members.

The optical connector plug of this invention may have at least one ferrule. When it has a plurality of ferrules, each of the ferrules has a space formed with respect to the protective guide member, and therefore there are a plurality of such spaces. In this case, the plurality of spaces may exist independently or may be connected by a linking passage provided in the protective guide member.

The plurality of ferrules are accommodated in the plurality of hollow passages of the optical connector receptor. In this case, the plurality of ferrules are given by optical connector plugs each having one ferrule and/or an optical connector plug including a plurality of ferrules. For example, one optical connector plug of the invention including two ferrules or two optical connector plugs of the invention each equipped with one ferrule may be fitted in an optical connector receptacle of the invention including two hollow passages.

Likewise, with respect to an optical connector receptacle having at least three hollow passages at least two of which exist in the space formed by the second supporting member while being present in a common first supporting member or first supporting members connected to each other, two ferrules of a single optical connector plug having the two ferrules may be filled in the aforesaid two hollow passages existing in the common first supporting member or the first supporting members connected to each other, and one ferrule of another optical connector plug of the invention having the one ferrule may be filled in another hollow passage.

In the optical connector plug of this invention having a plurality of ferrules, the arrangement of the ferrules in the protective guide member can naturally vary according to the form of the optical connector receptacle to be connected to the plug. For example, when the protective guide member has a cross-sectional surface having a shape extending in a direction at right angles to the entering direction of the optical connector plug, the plurality of the hollow passages of the first supporting member may be aligned side by side in the space formed by the second supporting member in the aforesaid extending direction of the space.

When the optical connector plug of this invention having the aforesaid structure is fitted into the optical connector receptacle, the receptacle can be supported and firmly fixed at least at the ferrule and the protective guide member.

In a preferred embodiment, the optical connector plug further has the aforesaid holding member which is received and supported by the third supporting member of the optical connector receptacle to render the connection of the plug to the receptacle firmer. Usually, the holding member is provided outwardly of the protective guide member.

The holding member of the plug may, for example, an outwardly opening spring-type holding member which upon collision with the supporting member, develops an outwardly opening spring action to press the supporting member outwardly and thus exhibits a holding action. By providing the holding member outwardly of the protective guide member, the protrusion of the third supporting member extending into the space formed by the third supporting member comes into tight fit into the protrusion receiving portion of the holding member whereby the protrusion receiving portion of the forward end part of the holding member is accommodated and firmly supported in the aforesaid space.

The optical connector plug of this invention may have a direction guide determining the direction of the plug into the optical connector receptacle. Although the fitting direction of the plug can also be regulated by forming the hollow passage of the receptacle in a form conforming directly to the ferrule of the plug, the provision of the direction guide can easily regulate the fitting direction.

The direction guide of the optical connector plug may, for example, be provided on the outer circumferential surface of the protective guide member or its inner circumferential surface facing the ferrule of the protective guide member. The direction guide can be provided as a protrusion or a recess on the outer or inner circumferential surface of the protective guide member.

Now, with reference to the accompanying drawings, the optical connector receptacle of the invention will be described more specifically.

Figure 1:
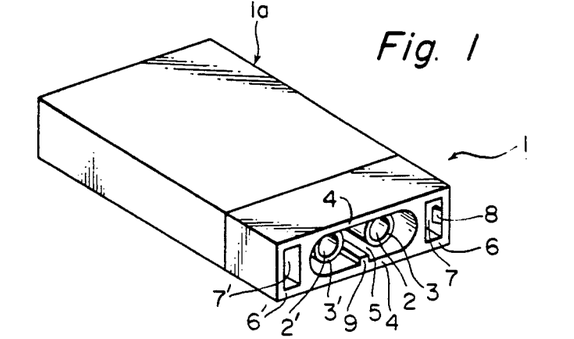
FIG. 1 is a perspective view of an optical data link having the receptacle of this invention built therein.
Figure 2:
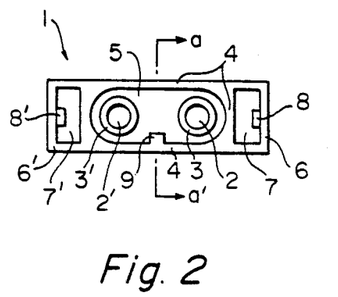
FIG. 2 is a front elevation of the receptacle portion of the optical data link shown in FIG. 1.

FIG. 1 is a perspective view of an optical data link having the receptacle of this invention built therein. FIG. 2 is a front elevation of the receptacle of the invention shown in FIG. 1, and FIG. 3 is a sectional view taken alone line a-a' of FIG. 2.

Figure 3:
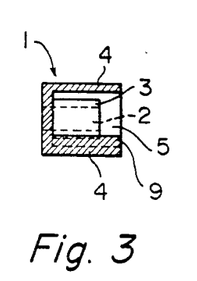
FIG. 3 is a sectional view taken on line a-a' of FIG. 2.

FIGS. 1 to 3 show one embodiment of the receptacle of this invention. The receptacle 1 has first supporting members 3,3' forming hollow passages 2,2' having a circular cross section. The first supporting members 3, 3' are spaced from each other in a space 5 formed by a second supporting member 4 as shown in the drawings. The illustrated receptacle further has third supporting members 6,6'. The third supporting members 6,6' form spaces 7,7', and protrusions 8,8' projecting at positions apart from the second supporting member 4 are present in the spaces 7,7'. A direction guide projecting into the space 5 formed by the second supporting member 4 is shown at 9.

An optical data link casing la having the receptacle of the invention incorporated therein is adapted for two-way light transmission and includes therein light emitting and light receiving elements, and an output and input interface to converters for converting optical information into elecrical information or vice versa.

Figure 4:
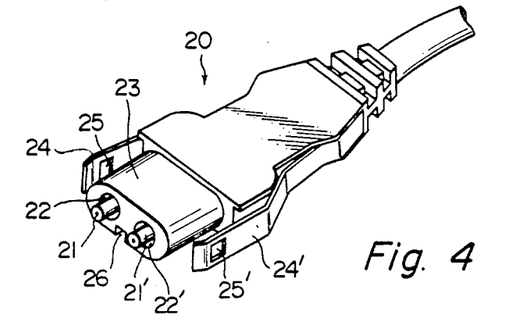
FIG. 4 is a perspective view of the optical connector plug of the invention which can be fitted into the receptacle shown in FIGS. 1 to 3.

FIG. 4 is a perspective view of an optical connector plug to be fitted into the receptacle of the invention shown in FIGS. 1 to 3. The optical connector plug 20 includes ferrules 21, 21' accommodating optical fibers and a protective guide member 23 surrounding the ferrules with spaces 22,22' from the ferrules 21,21'. Outwardly opening holding members 24,24' are provided and are open outwardly in the state shown in FIG. 4. Openings 25,25' are formed in the outwardly opening spring-type holding members 24,24', and a groove 26 is formed in the protective guide member.

In fitting the plug shown in FIG. 4 into the receptacle shown in FIGS. 1 to 3, the plug is stuffed into the receptacle in a direction in which the direction guide 9 of the receptacle is in alignment with the groove 26 of the plug. If the forward end of the outwardly opening spring-type holding member 24 of the plug 20 is slightly bent inwardly as shown in FIG. 4 so that the outside surface of the twisted forward end portion may contact the wall surfaces bearing the protrusions 8,8' of the third supporting members 6,6' of the receptacle 1, the plug can be easily and conveniently fitted into the receptacle by simply stuffing the plug into the receptacle without pressing the outwardly opening spring-type holding members with fingers.

By this fitting operation, the hollow passages 2,2' of the first supporting members 3,3' of the receptacle accommodate the ferrules 21,21' of the plug and the guide member 23 is accommodated in the space 5 between the second supporting member 4 and the first supporting members 3,3' of the receptacle. Furthermore, the outwardly opening spring-type holding member 24,24' of the plug are accommodated in the spaces 7,7' formed by the third supporting members 6,6' of the receptacle. The openings 25,25' of the outwardly opening spring-type holding members 24,24' come into engagement with the protrusions 8,8' in the spaces 7,7' of the receptacle, and the outwardly opening spring-type holding members are pushing outwardly the inner walls of the third supporting members having the protrusions 8,8'.

In this state, the receptacle and the plug are stably maintained in a normal fitted condition unless the outwardly opening spring-type holding members 24,24' are pressed by fingers to make them approach each other and the plug is pulled apart from the receptacle. Needless to say, during the above fitting operation, the first supporting members 3,3' of the receptacle 1 are accommodated within spaces 22,22' of the optical connector plug 20.

Figure 5:
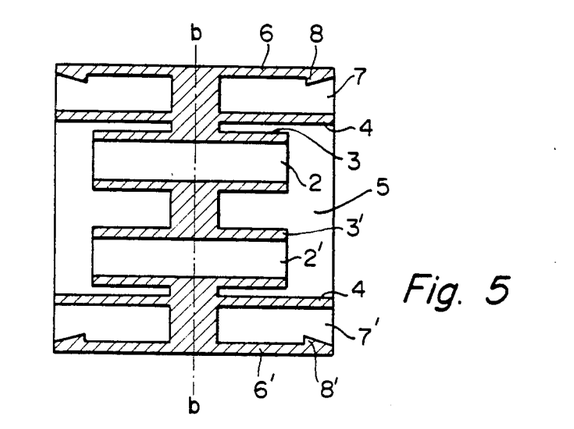
FIG. 5 is a sectional view of a relaying adapter in another embodiment of the receptacle of this invention.

FIG. 5 shows a sectional view of a relaying adapter as another embodiment of the receptacle of the present invention. The adapter shown in FIG. 5 is symmetrical with respect to the line b-b' and each of the symmetrical portions has the structure of the receptacle of the present invention. In FIG. 5, the same reference numerals as used in FIGS. 1 to 3 have the same meanings as in FIGS. 1 to 3.

When a condition is assumed in which the plug shown in FIG. 4 is fitted into each of the right and left portions of the relaying adapter of FIG. 5, it will be readily understood that optical communications are exchanged between the ferrules of the plugs facing each other in the hollow passages 2,2'.

FIGS. 6a to 6f, 7 and 8 show rough front elevations of various embodiments of the receptacle of this invention. In FIGS. 6a to 6f, 7 and 8, the same reference numerals as in FIGS. 1 to 3 have the same meanings as in FIGS. 1 to 3.

Figure 6A:
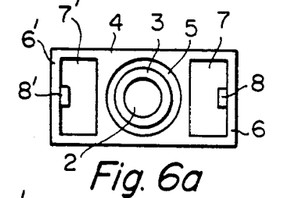
FIGS. 6a to 6f, 7 and 8 are rough front elevations of various types of the receptacle of this invention.

The receptacle shown in FIG. 6a is a receptacle for a single core and has only one hollow passage 2 provided by the first supporting member 3. In the drawings, the cross sectional shape of the hollow passage is circular, but may be otherwise. The same can be said in the following description.

Figure 6B:
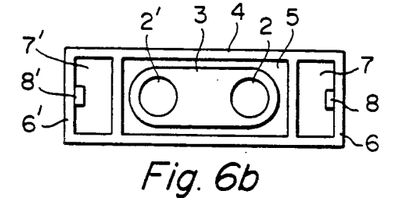

The receptacle of FIG. 6b includes two hollow passages 2,2' in a common first supporting member 3.

Figure 6C:
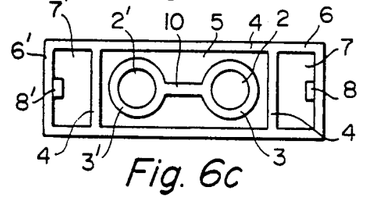

The receptacle shown in FIG. 6c includes two first supporting members 3,3' respectively having hollow passages 2,2', and the first supporting members 3,3' are connected by a linking member 10. An optical connector plug having two ferrules such as the one illustrated in FIG. 4, or two plugs each having one ferrule in juxtaposition may be fitted into the receptacle having two hollow passages as shown in FIGS. 6b and 6c.

Figure 6D:
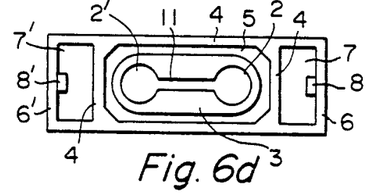

In the receptacle of FIG. 6d, two hollow passages 2,2' are provided in a common first supporting member 3, and the two hollow passages are connected by a linking passage 11 formed in the supporting member.

Figure 6E:
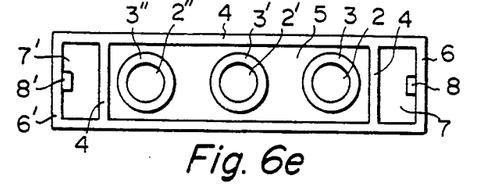
Figure 6F:
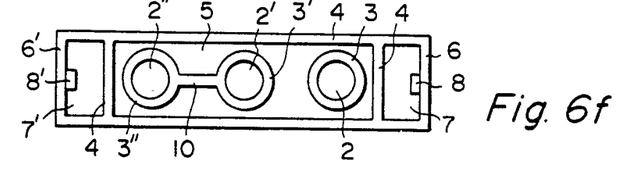

The receptacles shown in FIGS. 6e and 6f have three hollow passages 2, 2',2''. In the receptacle of FIG. 6e, the three hollow passages are provided by three independent first supporting members 3,3' and 3'', and in the receptacle of FIG. 6f, first supporting members 3' and 3'' forming the two hollow passages 2' and 2'' are connected by a linking member 10, and another first member 3 forming another hollow passage 2 exists independently of the first supporting members 3' and 3''. An optical connector plug having three ferrules, or a combination of a plug having one ferrule and a plug having two ferrules may be fitted into the receptacles shown in FIGS. 6e and 6f. Or three plugs each having one ferrule may be fitted into such receptacles as shown in FIGS. 6e and 6f.

Since the receptacle of this invention has such as structure as can support the optical connector plug at two sites, or preferably three sites, the normal fitted condition between the receptacles and plugs can be maintained even when a plurality of optical connector plugs are fitted into a receptacle having a plurality of hollow passages.

Figure 7:
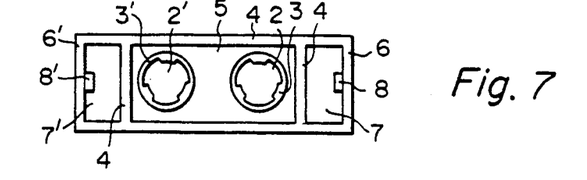

The receptacle shown in FIG. 7 has hollow passages of such a shape that the cross section of each hollow passage has three portions on the circumference which project toward the center of the circle and a substantially circular phantom circle can be formed by connecting the forward ends of the projecting portions. The hollow passages form straight passages at the phantom circle parts to permit entry of the optical connector plug, and hold the ferrules at the projecting portions after entry.

Figure 8:
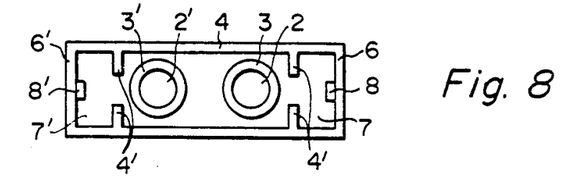

In the receptacle shown in FIG. 8, the second supporting member is cut at those parts which have the third supporting members outside. In the receptacle having the structure shown in FIG. 8, the protective guide member of the optical connector plug fitted into the space 5 formed by the second supporting member 4 is kept from moving to the right or left in FIG. 8 by dint of the cut portions 4' of the second supporting member 4 and the first supporting members 3,3', and the normal fitted condition can be maintained.

Now, the optical connector plug of this invention will be more specifically described with reference to the accompanying drawings.

Figure 9:
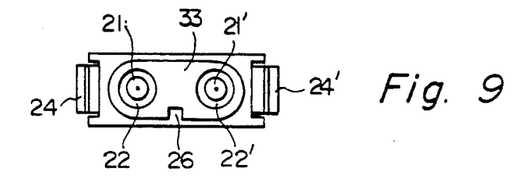
FIG. 9 is a front elevation of the optical connector plug shown in FIG. 4.

One embodiment of the optical connector plug of this invention is shown in FIG. 4. FIG. 9 shows a front elevation of the plug shown in FIG. 4. The plugs shown in FIGS. 4 and 9 have the same structure and function as described hereinabove with regard to the optical connector receptacle of FIGS. 1 to 3.

Figures 10, 11:
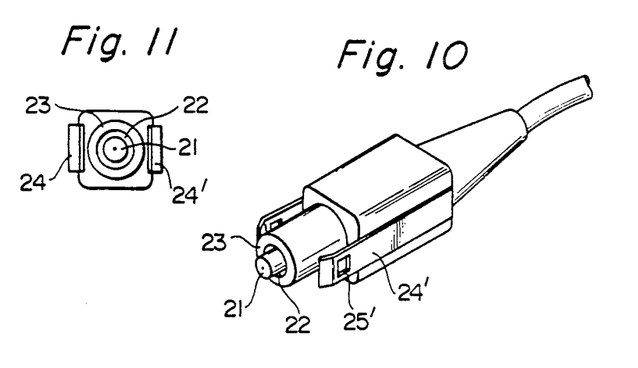
FIG. 10 is a perspective view of another embodiment of the optical connector plug of this invention.
FIG. 11 is a front elevation of the plug shown in FIG. 10.

FIG. 10 shows a rough perspective view of another embodiment of the plug of this invention. FIG. 11 shows a front elevation of the plug shown in FIG. 10. The plug shown in FIGS. 10 and 11 has only one ferrule 21. A protective guide member 23 exists around the ferrule 21 with a space 22 therebetween, and spring-type holding members 24,24' having an opening 25' are located outwardly of the protective guide member.

Figures 12, 13:
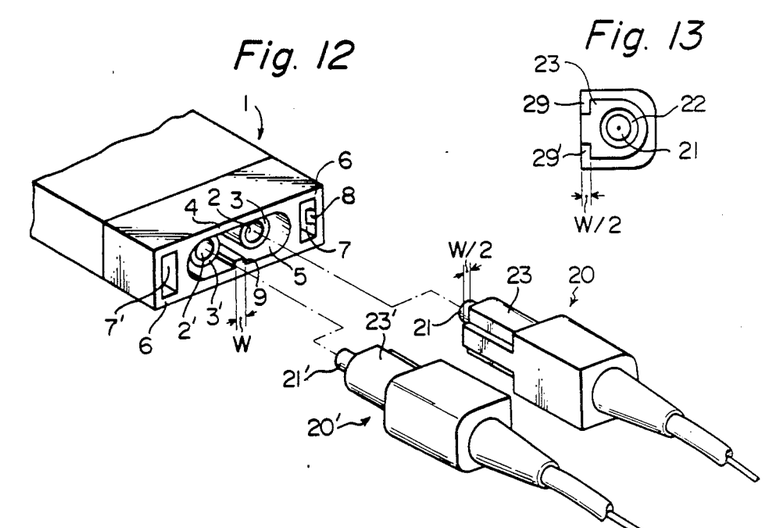
FIG. 12 is an explanatory view for illustrating the state of fitting two optical connector plugs of this invention each having one ferrule into one receptacle having two optical hollow passages.
FIG. 13 is a front elevation of each of the plugs used in FIG. 12.

FIG. 12 is an explanatory view for illustrating the manner of the fitting of a plug 20 of the invention having one ferrule 21 and a plug 20' of the invention having one ferrule 21' into one receptacle 1 provided with two hollow passages. FIG. 13 shows a front elevation of the plug 20 or 20' of the invention. The plugs 20 and 20' of the invention shown in FIGS. 12 and 13 have direction guides 29,29' each forming a recessed portion on the outer circumferential surface of the protective guide member 23. The width of each of the direction guides 29, 29' may be about one-half of the width W of a projecting direction guide 9.

When the plug 20 is fitted into the receptacle 1, the ferrule 21 of the plug 20 is received in the hollow passage 2 of the receptacle, and the protective guide member of the plug is received in the space 5 of the receptacle. Simultaneously, the first supporting member 3 of the receptacle is received within a space 22 of the plug.

On the other hand, the plug 20' is fitted into the receptacle 1 in juxtaposition with the plug 20 as shown in FIG. 12. In this state, the ferrule 21' of the plug 20' is received in the hollow passage 2' of the receptacle; the protective guide member 23' of the plug 20', in the space 5 of the receptacle; and simultaneously, the first support member 3' of the receptacle, in the space 22' of the plug.

Figure 14:
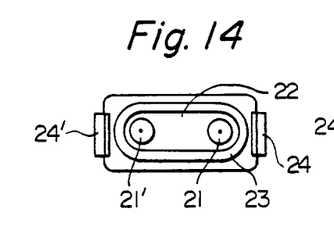
FIGS. 14 and 15 are front elevations of other embodiments of the optical connector plugs of this invention.
Figure 15:
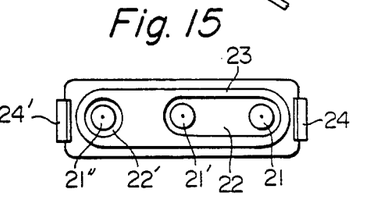

FIGS. 14 and 15 show front elevations of other embodiments of the optical connector plug of this invention having 2 and 3 ferrules, respectively.

In the plug of FIG. 14, a common space 22 exists between the ferrules 21,21' and the protective guide member 23.

In the plug of FIG. 15, a common space 22 is formed between the ferrules 21,21' and the protective guide member 23 as in FIG. 14, and a space 22' is formed between the other ferrule 21" and the projective guide member 23.

Figure 16:
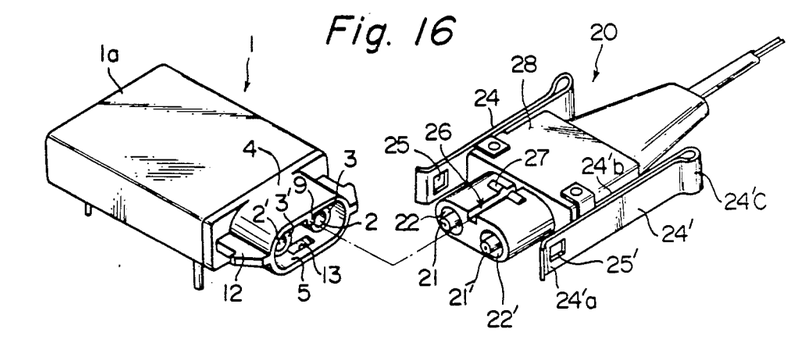
FIG. 16 is a perspective view of still another embodiment of the receptacle and plug of this invention.

FIG. 16 shows another embodiment of the receptacle and plug of the present invention. The great difference of the optical connector receptacle shown in FIG. 16 from that shown in FIG. 1 is that the receptacle of FIG. 16 has a latching protrusion 12 extending outwardly from the outside surface of the second supporting member for engagement with the holding member of the optical connector plug, and that it has a wedge-shaped recess 13.

The optical connector plug of FIG. 16 differs from those described above in that it has inwardly closing spring-type holding members 24,24' and a protruding portion 27 corresponding to the recess 13 of the receptacle. The holding members 24, 24' are each made by folding one metallic plate, providing openings 25,25' respectively at one ends 24a and 24'a, and fixing the other ends 24b,24'b to a plug housing 28. By holding the folded portions 24c,24'c with hand or lifting the one ends 24a,24'a, the forward end portions of the one ends 24a,24'a having the openings 25,25' provided therein are opened so that the openings 25,25' can be hooked onto the engaging protrusion 12 of the receptacle.

What is claimed is:

1. An optical connector receptacle adapted to receive and connect in tight fit with at least one optical connector plug which has a protective guide member surrounding at least one ferrule containing an optical fiber, the outer surface of each said ferrule being separated by a defined space from an inner surface of the guide member surrounding said ferrule, said receptacle comprising:
   a housing having at least one space open to the receiving end of said receptacle, said one space having a profile conforming to the profile of the outer surface of the protective guide member of said plug,
   at least two separate supporting members disposed linearly adjacent one another within said one space of the housing, each said supporting member surrounding and defining at least one passage extending from said receiving end of the receptacle to the opposite end, the outer surface of each said supporting member being separated from an inner surface of the housing by the remainder of said one space, each said supporting member having a cross-sectional shape conforming to the defined space between said ferrule and the guide member of the plug, and
   a pair of apertures formed in said housing on opposite sides of said one space, each aperture being open to the receiving end of the receptacle and adapted to receive one of a corresponding pair of spring latching arms extending along opposite sides of the protective guide member of said plug, each said aperture having therein means for releasably latching with each arm of the plug,
   whereby when said plug is inserted into the receptacle, the ferrule will be received within the passage defined by said supporting member while said supporting member is received within the defined space between the ferrule and the guide member, and the guide member is received within the remainder of said one space of the housing, all respective mating surfaces between the receptacle and plug contributing to said tight fit, said plug being further retained within the receptacle by the arms releasably latched within said pair of apertures of said receptacle.

2. The optical connector receptacle of claim 1 wherein at least two separate plugs, each with at least one ferrule disposed within a protective guide member, are received within said one space to mate respectively with one of said separate supporting member.

3. The optical connector receptacle of claim 1 wherein at least two ferrules are disposed within a protective guide member of one plug which is received within said one space.

4. The optical connector receptacle of claim 1, wherein one of the supporting members has at least two separate pasages for mating with the ferrules disposed within a protective guide member of one plug and another of the support members mates with a separate plug.

5. The optical connector receptacle of claim 1 wherein said one space in the receptacle further includes diretion guide means for ensuring proposed alignment of each said plug with the receptacle.

6. The optical connector receptacle of claim 1, further comprising an optical data link disposed at said opposite end of said receptacle housing, said data link being adapted for two-way light transmission along from and to the optical fiber of each ferrule, and for converting optical information to and from electrical information.

7. The optical connector receptacle of claim 1, further comprising at the opposite end of said receptacle a second identical receptacle which is the mirror image of the first, both receptacles having a common housing to form an adaptor for receiving plugs at either end.

8. An optical connector plug adapted to be received in and connect in tight fit with an optical connector recpetacle which has a housing with at least one space open to the receiving end of the receptacle and at least two separate supporting members disposed linearly adjacent one another in said one space, each said supporting member surrounding and defining at least one passage extending from said receiving end to the opposite end, the outer surface of each said supporting member being separated from an inner surface of the housing by the remainder of said one space, said plug comprising
   at least one ferrule containing an optical fiber adapted to be received within said one passage defined by the supporting member of the receptacle, a protective guide member surrounding said ferrule, the outer surface of the ferrule being separated by a defined space from an inner surface of the guide member surrounding said ferrule, the outer surface of said protective guide member havign a profile conforming to the profile of said one space of the receptacle, said defined space between the ferrule and protective guide member conforming to the cross-sectional shape of said supporting member of the receptacle housing, and a pair of spring arms extending along opposite sides of the protective guide member of said plug, said spring arms adapted to be received and releasably latched within a corresponding pair of apertures formed in said receptacle housing on opposite sides of said one space, whereby when said plug is inserted into the receptacle, the ferrule will be received within the passage defined by said supporting member while said supporting member is received within the defined space between the ferrule and the guide member, and the guide member is received within the remainder of said one space of the housing, all respective mating surfaces between the receptacle and plug contributing to said tight fit, said plug being further retained within the receptacle by said pair of apertures of said spring arms being releasably latched within the receptacle.

9. The optical connector plug of claim 8 wherein the protective guide member has at least two separate ferrules disposed therein.

10. The optical connector plug of claim 8 wherein two plugs each with at least one ferrule are received with the receptacle housing.

11. The optical connector plug of claim 10 wherein one of the two plugs has two separate ferrules disposed therein.

12. The optical connector plug of claim 8, further comprising a direction guide means provided along the outer surfaces of the protective guide member for ensuring proper alignment of the plug within the receptacle.

* * * * *